J. P. GORDON.
AUTOMOBILE HOOD.
APPLICATION FILED MAY 2, 1910.
975,128.
Patented Nov. 8, 1910.
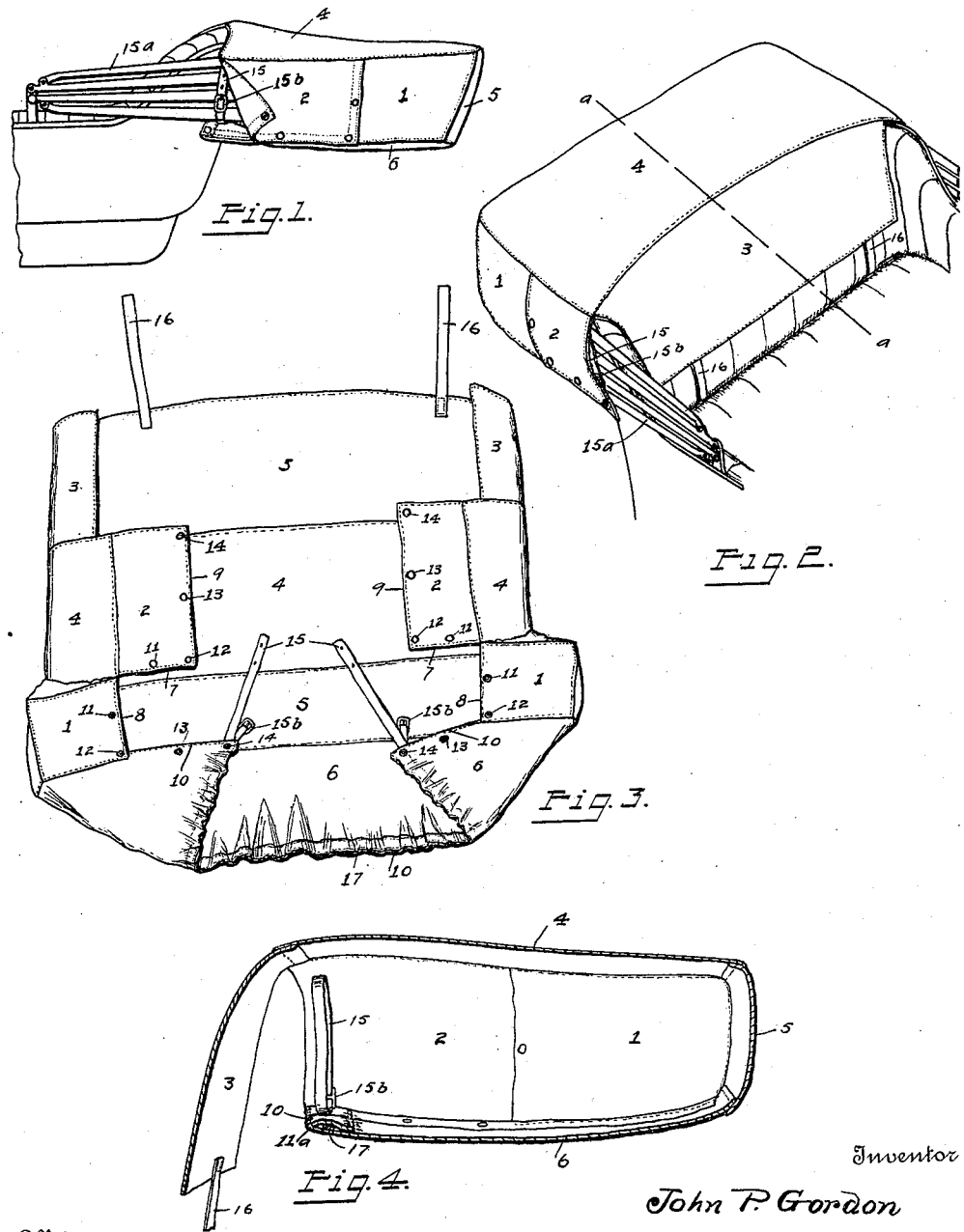
Witnesses
Inventor
John P. Gordon
By
Attorney

UNITED STATES PATENT OFFICE.

JOHN P. GORDON, OF COLUMBUS, OHIO.

AUTOMOBILE-HOOD.

975,128. Specification of Letters Patent. Patented Nov. 8, 1910.

Application filed May 2, 1910. Serial No. 558,883.

*To all whom it may concern:*

Be it known that I, JOHN P. GORDON, a citizen of the United States, residing at Columbus, in the county of Franklin and State of Ohio, have invented certain new and useful Improvements in Automobile-Hoods, of which the following is a specification.

My invention relates to automobile hoods of that class which are usually formed of waterproof material and adapted to incase automobile covers, when the latter are not in use.

The objects of my invention are to provide an automobile top cover of this class, of improved construction by means of which an automobile top may be covered and the cover retained in its place about the top without the necessity of employing lacings; to so construct my improved cover as to provide a box-like casing for an automobile top, neat in appearance and capable of being readily applied thereto or removed therefrom. These objects I accomplish in the manner illustrated in the accompanying drawing, in which—

Figure 1 is a side elevation of my improved hood, Fig. 2 is a perspective view of the same, Fig. 3 is an inner face view, and, Fig. 4 is a sectional view along the line *a—a* of Fig. 1.

Similar numerals refer to similar parts throughout the several views.

The body of my improved hood is substantially in the form of a long strip of flexible and waterproof material joined to other strips of like material, within which the automobile cover is adapted to be incased and which when in a closed position secures said cover in the form, essentially, of a rectangular, box-like package, having an apron of the same material depending therefrom adapted to cover the back of the seat next to the folded cover. In placing a box-like cover about a vehicle top disposed to hang in a wedge shaped form from the back of a vehicle, some difficulty has been experienced in producing a neat and closely fitting wrapper, owing to the bulkiness of the folded top. This difficulty I overcome by constructing my improved cover as follows: 1 represents the central section 4 of the cover, which is in the form of a broad strip of material, extending throughout the length of the cover and which has its edges formed straight and parallel as shown, portions of this strip being indicated in Fig. 3 of the drawing. To opposite edges of this straight central strip, I sew the inner edge of section 3, the free flap of which falls over the back of the rear seat and I also attach the section 5 which forms the back of the box-like formation shown, when the cover is assembled and in use. Rectangular pieces 2 are sewed to the ends of strip 4 and pieces 1 are sewed to the respective ends of piece 5, said pieces 1 and 5 forming the narrow ends and sides of the box-like cover. Piece 2 is adapted to be turned so that the margin 7 thereof may be secured by buttons in overlapping position to margin 8 of piece 1 and margin 9 thereof may be similarly secured to margin 10 of strip 6 which is a straight piece having a marginal shirred casing shown at $11^a$ and inclosing an elastic band, which has its ends secured within the casing at points on opposite sides of the center of the length thereof. Straps 15 are provided with buckles $15^b$ by means of which the top is firmly secured in its covered position as shown in Fig. 1.

In employing my invention, the cover formed as above described, is made to incase an automobile top in the manner shown in Fig. 1, in such a manner that the central straight cover section 4 infolds the top of the vehicle cover as shown in Fig. 3, while the side sections 1 and 2 infold the ends thereof as shown in Figs. 1 and 2. The sections named being in this position on the vehicle cover, the edge strip 6 extends over and infolds the lower part thereof. One half of the cover having been placed in position and held firmly to its place by means of the elastic band 17, the several buttons heretofore referred to and which are indicated at 11, 12, 13 and 14, are snapped or secured together, the straps 15 being secured about the bows $15^a$ of the top as shown in Fig. 1. The apron 3 falls over the back of the rear seat and is sufficiently held in this position by straps 16 passing under the cushion of the rear seat and held in place by the weight of the cushion.

The tendency to bagging or puckering of any part of the cover, is obviated by the use of the elastic band 17 and when the cover is applied in the manner described, it produces a smooth external casing.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. A waterproof hood for automobile tops comprising a broad central strip, a narrow strip joined longitudinally to the edge thereof, a terminal strip similarly joined to the margin of the narrow strip, an apron strip similarly joined to the remaining margin of the central strip, smaller pieces at the respective extremities of the central strip and the narrow strip adapted to coöperate with the other strips and form a box-like inclosure when the cover is in a closed position, an elastic band in the terminal strip adapted to preserve a smooth external casing, means for securing the apron strip against the back of the seat, means for enwrapping the bows of the vehicle top and securing the cover in position.

2. In a hood for automobile tops, a plurality of waterproof strips joined along their parallel longitudinal margins, shorter rectangular pieces joined to the extremities of the interior strips and so united thereto as to form the several parts into a box-like inclosure when the hood is in a closed position, an elastic band adapted to preserve a smooth external casing, means for securing the parts in a closed position, means for binding the cover to the top of a vehicle, means for securing the apron against the back of the rear seat thereof.

3. In a hood for automobile tops, a broad strip adapted to form the top of a box-like inclosure therefor, an oppositely disposed strip adapted to form the bottom of the box, a narrow strip joined to the longitudinal margins of the broad strips respectively and to the ends thereof and terminating midway of the ends thereof adapted to connect the parallel side members of the box formation, short strips attached to the upper edges of the box adjacent to the termination of the narrow strips, means for securing said strips to complete the box-like inclosure, an apron strip joined to the broad strip and adapted to cover the back of the rear seat of the vehicle.

In testimony whereof I affix my signature in presence of two witnesses.

JOHN P. GORDON.

Witnesses:
A. L. PHELPS,
E. B. MAURER.